US010549802B2

(12) United States Patent
Tepass

(10) Patent No.: US 10,549,802 B2
(45) Date of Patent: Feb. 4, 2020

(54) METHOD FOR CONTROLLING A DRIVE FOR DISPLACING THE HEIGHT OF A SADDLE OF A TWO-WHEELED VEHICLE, DEPENDING ON A SITUATION, AND A DEVICE PROVIDED FOR SAME

(71) Applicant: Robert Bosch GmbH, Stuttgart (DE)

(72) Inventor: Bernd Tepass, Beilstein (DE)

(73) Assignee: Robert Bosch GmbH, Stuttgart (DE)

( * ) Notice: Subject to any disclaimer, the term of this patent is extended or adjusted under 35 U.S.C. 154(b) by 177 days.

(21) Appl. No.: 15/558,654

(22) PCT Filed: Feb. 29, 2016

(86) PCT No.: PCT/EP2016/054208
§ 371 (c)(1),
(2) Date: Sep. 15, 2017

(87) PCT Pub. No.: WO2016/146368
PCT Pub. Date: Sep. 22, 2016

(65) Prior Publication Data
US 2018/0105222 A1    Apr. 19, 2018

(30) Foreign Application Priority Data

Mar. 18, 2015   (DE) ........................ 10 2015 204 880

(51) Int. Cl.
*B62J 1/08*          (2006.01)
*B62K 19/36*         (2006.01)
*B62J 99/00*         (2009.01)

(52) U.S. Cl.
CPC ................. *B62J 1/08* (2013.01); *B62J 99/00* (2013.01); *B62K 19/36* (2013.01);
(Continued)

(58) Field of Classification Search
CPC .............. B62J 1/08; B62J 99/00; B62K 19/36
See application file for complete search history.

(56) References Cited

U.S. PATENT DOCUMENTS 6,050,585 A    4/2000  Rai
9,422,018 B2 * 8/2016  Pelot ...................... B62K 19/36
(Continued)

FOREIGN PATENT DOCUMENTS

DE    296 15 569 U1   12/1996
DE    602 09 510 T2    9/2006
(Continued)

OTHER PUBLICATIONS

International Search Report corresponding to PCT Application No. PCT/EP2016/054208, dated May 10, 2016 (German and English language document) (7 pages).

*Primary Examiner* — Anthony D Barfield
(74) *Attorney, Agent, or Firm* — Maginot, Moore & Beck LLP

(57) ABSTRACT

A method for controlling a drive for displacing a saddle into a travel or a mounting position, comprising measuring an acceleration and a lateral inclination of the two-wheeled vehicle continuously within a first time interval and a speed of the two-wheeled vehicle after the first time interval; carrying out a first acceleration comparison, which checks whether the acceleration is greater than a minimum positive acceleration, at least for a second time interval; carrying out a first speed comparison if the first acceleration comparison is positive, the first speed comparison checks whether the speed is higher than a minimum speed; displacing the saddle into the travel position if the first speed comparison is positive; and carrying out a second acceleration comparison if the first acceleration comparison is negative, the second acceleration comparison checks whether the acceleration is less than a minimum negative acceleration at least for a third time interval.

7 Claims, 2 Drawing Sheets

(52) U.S. Cl.
    CPC .... *B62J 2001/085* (2013.01); *B62J 2099/002* (2013.01); *B62J 2099/004* (2013.01)

(56) References Cited

U.S. PATENT DOCUMENTS

| | | | |
|---|---|---|---|
| 9,423,231 B2 * | 8/2016 | Fernandez Sanchez ... | B62J 1/00 |
| 2012/0274043 A1 | 11/2012 | Lee et al. | |
| 2019/0009780 A1 * | 1/2019 | Komatsu .................... | B62J 1/08 |

FOREIGN PATENT DOCUMENTS

| | | |
|---|---|---|
| DE | 20 2006 010 280 U1 | 10/2006 |
| DE | 10 2010 035 674 A1 | 3/2011 |
| DE | 10 2010 044 229 A1 | 4/2011 |
| DE | 10 2011 012 063 A1 | 8/2011 |
| DE | 20 2011 103 073 U1 | 11/2011 |
| EP | 2 476 605 A1 | 7/2012 |
| EP | 2 540 606 A1 | 1/2013 |
| EP | 2 657 113 A2 | 10/2013 |
| JP | 2005-262900 A | 9/2005 |
| WO | 2011/018760 A1 | 2/2011 |

\* cited by examiner ial Stage Application of PCT/EP2016/054208, filed on Feb. 29, 2016, which claims the benefit of priority to Serial No. DE 10 2015 204 880.2, filed on Mar. 18, 2015 in Germany, the disclosures of which are incorporated herein by reference in their entirety.

BACKGROUND

The disclosure relates to a method for controlling a drive for displacing the height of a saddle of a two-wheeled vehicle, depending on a situation. In addition, the disclosure relates to a device which is configured to carry out such a method.

A device for adjusting the height of a saddle of a two-wheeled vehicle is shown, for example, in the German Utility Model document DE 20 2011 103 073 U1. This document additionally describes a method which controls the saddle height, depending on a situation. Here, the saddle is displaced as a function of the speed of travel and during travel operation. Thus, the saddle is lowered if the speed of the two-wheeled vehicle falls below a limiting speed, from which it is possible to conclude that the two-wheeled vehicle is stopping. In a corresponding way, the saddle is raised if the speed of the two-wheeled vehicle exceeds a limiting speed, from which it is possible to conclude that travel is starting. Consequently, the mounting position is usually lower than the travel position.

SUMMARY

The disclosure relates to a method for controlling a drive for displacing a saddle of a two-wheeled vehicle, in particular a bicycle, into a travel position or a stopping position. Here, at the start a lateral inclination and an acceleration are measured continuously within a first time interval, which means that during the first time interval multiple, in particular equidistant measured values are measured, and a speed of the two-wheeled vehicle is measured after this first time interval. A first acceleration comparison is then carried out, which checks whether the acceleration is greater than a minimum positive acceleration, at least for a second time interval. If this first acceleration comparison is positive, a first speed comparison is carried out, which checks whether the speed is higher than a minimum speed. If the first speed comparison is positive, the saddle is displaced into the travel position. On the other hand, if the first acceleration comparison is negative, a second acceleration comparison is carried out, which checks whether the acceleration is less than a minimum negative acceleration, at least for a third time interval. If this second acceleration comparison is positive, a second speed comparison is carried out, which checks whether the speed is higher than the minimum speed. If this second speed comparison is negative, the saddle is displaced into the mounting position.

Here, it is advantageous that, in this method, recourse is had to various physical operating variables of the two-wheeled vehicle, in order to displace the saddle into the travel position or the mounting position, depending on said variables. In addition, a distinction is drawn between travel or starting to travel and stopping and an appropriate reaction thereto is made. Thus, if an acceleration which is greater than the minimum positive acceleration is detected and, in addition, it lasts at least over a second time interval, it can be assumed that the two-wheeled vehicle has been set moving and in particular is just beginning to travel. In addition, by means of the first speed comparison, it is checked whether the two-wheeled vehicle has at least a minimum speed. If this is the case, it can be assumed that the two-wheeled vehicle has been started and is in a stable state. Only then is it safe to move the saddle into the travel position without impairing the stability of the traveling operation, as a result of which an accident could possibly be caused. If, on the other hand, an acceleration which is less than a minimum negative acceleration is detected and lasts at least over a third time interval, it can be assumed that the two-wheeled vehicle is to become slower and in particular is to stop. By using the second speed comparison in conjunction with the acceleration comparisons previously carried out, it can be concluded whether the two-wheeled vehicle is about to stop or has already stopped.

In this way, the saddle can be displaced depending on a situation, which firstly increases the safety for the person who uses the two-wheeled vehicle and secondly increases the convenience for said person. The safety and the convenience are increased in that it is made possible for a person to mount or dismount from the two-wheeled vehicle, during which the saddle is still in the mounting position. Since, in this phase, the system comprising person and two-wheeled vehicle is still at its most unstable, a lower saddle permits both more convenient mounting or dismounting from the saddle and also a safer state, since the person who is already sitting on the saddle can place both feet flat on the ground. In addition, as a result of displacing the saddle into the travel position, if travel or starting to travel of the two-wheeled vehicle has been measured, the convenience is increased, since in a higher sitting position the transmission of force to the two-wheeled vehicle is improved and the loading of the body, in particular of the joints, during travel is reduced.

One advantageous refinement of the method according to the disclosure provides that if the second acceleration comparison is negative, a first lateral inclination comparison is carried out, which checks whether a first lateral inclination value is greater than a first lateral inclination limiting value, and which additionally checks whether a second lateral inclination value, which has been measured after the first lateral inclination value, is less than a second lateral inclination limiting value. Here, the first lateral inclination limiting value is greater than or equal to the second lateral inclination limiting value. If the first lateral inclination comparison is positive, the saddle is displaced into the travel position.

Here, it is advantageous that, by means of the first lateral inclination comparison, it is possible to draw conclusions as to whether the two-wheeled vehicle has been mounted. The reason for this is that, during the mounting process, the two-wheeled vehicle is inclined to the side in the normal case and then, during mounting, the two-wheeled vehicle is guided back into the initial position again, which has no or only a very slight lateral inclination. In addition, for the displacement of the saddle, depending on the situation, a further physical operating variable of the two-wheeled vehicle is used. The first lateral inclination comparison is carried out when the acceleration is between the minimum positive acceleration and the minimum negative acceleration, or these limiting values have merely been exceeded for a shorter time than the second time interval or a shorter time than the third time interval. This avoids the situation in which, for example, slight movement of the two-wheeled vehicle during the mounting process is already assessed as starting to travel or to stop.

A further advantageous refinement of the method according to the disclosure provides for the saddle to be displaced with a time delay.

Here, it is advantageous that, as a result of the delayed displacement of the saddle, the stability of the system comprising person and two-wheeled vehicle is increased. It is thus made possible that, during starting or braking, the saddle is changed only as soon as the rider of the two-wheeled vehicle is traveling safely or has already stopped. Furthermore, when it is detected that a person is mounting the two-wheeled vehicle, the person is given sufficient time to sit on the saddle and possibly already to start to travel.

A further advantageous refinement of the method according to the disclosure provides that if the first speed comparison is positive, a second lateral inclination comparison is additionally carried out, which checks whether the lateral inclination after the first time interval is smaller than a second lateral inclination limiting value. If the second lateral inclination comparison is positive, the saddle is displaced into the travel position.

Here, it is advantageous that, before displacing the saddle, the lateral inclination of the two-wheeled vehicle is checked. In this way, displacement of the saddle is carried out only when the two-wheeled vehicle is in a stable position suitable for the purpose. Consequently, the saddle of the two-wheeled vehicle is not raised when the two-wheeled vehicle is in a certain inclined position. In such an inclined position, displacement of the saddle could irritate the rider of the two-wheeled vehicle and, in the worst possible case, disturb the equilibrium of said person, in such a way that a possible crash could follow. For this reason, displacement of the saddle is to be avoided in any case if the two-wheeled vehicle has too high a lateral inclination.

A further advantageous refinement of the method according to the disclosure provides that if the first lateral inclination comparison is positive, a third acceleration comparison is additionally carried out, which checks whether at least one acceleration value, which was measured chronologically after the second lateral inclination value, is greater than the minimum positive acceleration. If the third acceleration comparison is positive, the saddle is displaced into the travel position.

Here, it is advantageous that, by using the third acceleration comparison, it is possible to detect a movement of the two-wheeled vehicle which has occurred after a person has mounted the two-wheeled vehicle. On the basis of such a movement detection, it is possible to conclude whether, for example, the two-wheeled vehicle is starting to travel. Thus, it can be assumed that, after a person has mounted the two-wheeled vehicle, travel has started if the third acceleration comparison is positive.

According to an advantageous refinement of the method according to the disclosure, provision is made that if the first lateral inclination comparison is positive, a third speed comparison is additionally carried out, which checks whether the speed is higher than the minimum speed. If the third speed comparison is positive, the saddle is displaced into the travel position.

Here, it is advantageous that, by using the third speed comparison, it is possible to detect whether the two-wheeled vehicle is moving after it has been detected that a person has mounted the two-wheeled vehicle and before displacement of the saddle has been carried out. Thus, the saddle is displaced only when the two-wheeled vehicle is moving onward at a speed which is above the minimum speed, for example the walking speed of the person. If the speed is above this minimum speed, it can reliably be assumed that travel has started and the system comprising person and two-wheeled vehicle is in a stable state.

According to a further advantageous refinement of the method according to the disclosure, provision is made that if the first lateral inclination comparison is positive, a third lateral inclination comparison is additionally carried out, which checks whether the lateral inclination after the first time interval is less than the second lateral inclination limiting value. If the third lateral inclination comparison is positive, the saddle is displaced into the travel position.

Here, it is advantageous that, before the displacement of the saddle into the travel position, the lateral inclination of the two-wheeled vehicle is checked, as a result of which displacement of the saddle is carried out only when the two-wheeled vehicle is in a stable position suitable for the purpose. Thus, the saddle of the two-wheeled vehicle is displaced into the travel position when the two-wheeled vehicle is not in a certain inclined position. In such an inclined position, displacement of the saddle could irritate the rider of the two-wheeled vehicle and, in the worst possible case, disturb the equilibrium of said person, in such a way that a crash could follow. For this reason, displacement of the saddle is to be avoided in any case if the two-wheeled vehicle has too high a lateral inclination.

In addition, the disclosure relates to a device having a drive for displacing a saddle of a two-wheeled vehicle, depending on a situation, into a travel position or into a mounting position. The nub of the disclosure is that the drive is arranged within a saddle tube of the two-wheeled vehicle and is connected to a threaded rod or a pinion, wherein a saddle pillar of the saddle has a rack, and wherein the threaded rod or the pinion bears on the rack. Here, the saddle can be displaced via the movement of the threaded rod or of the pinion.

Here, it is advantageous that the drive is invisible from outside and in addition is protected against external influences, such as rain and dirt. In addition, by means of such a drive, the saddle can be displaced vertically uniformly and continuously. This achieves a situation where the stability of the system comprising person and two-wheeled vehicle is ideally not reduced as the saddle is displaced.

An advantageous refinement of the device according to the disclosure provides for the rack to be fitted outside the saddle pillar.

Here, it is advantageous that the drive can be arranged laterally within the saddle tube.

A further advantageous refinement of the device according to the disclosure provides for the rack to be fitted within the saddle pillar.

Here, it is advantageous that the drive can be arranged centrally in the saddle tube and the pinion consequently penetrates centrally into the hollow saddle pillar. In this way, the transmission of force can act centrally on the saddle pillar. In addition, a conventional saddle pillar can also be provided subsequently with a rack in order that the latter can be used for such a device.

DETAILED DESCRIPTION

Figure 1:
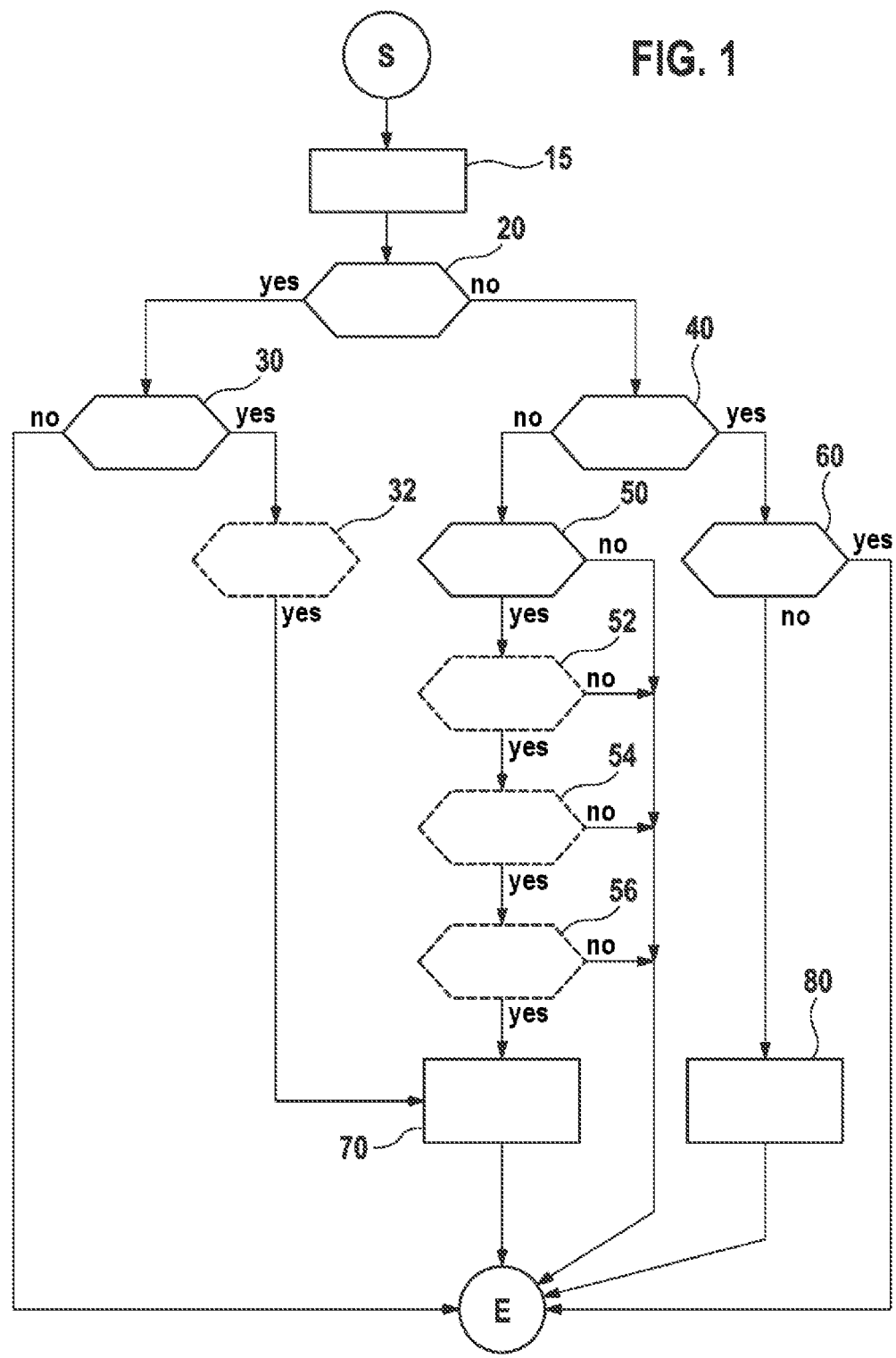
FIG. 1 shows a first exemplary embodiment of a method according to the disclosure.

FIG. 1 shows a first exemplary embodiment of a method according to the disclosure. The method is used to control a drive 110 in order to displace a saddle 120 of a two-wheeled vehicle 130, depending on a situation, into a travel position 122 or into a mounting position 124, wherein the two-wheeled vehicle 130 is a bicycle, for example. Here, a mounting position 124 is understood to be a position which the saddle 120 is preferably intended to assume for mounting or else for dismounting. On the other hand, the travel position 122 is the position of the saddle 120 which the saddle 120 is preferably intended to assume during travel of the two-wheeled vehicle 130. In order here to permit particularly convenient mounting and dismounting and also a stable and comfortable travel position 122, the saddle 120 in the mounting position 124 is lower than the saddle 120 in the travel position 122.

After the start S of the method, a measurement 15 is made of a lateral inclination α, an acceleration a and a speed v of the two-wheeled vehicle. The lateral inclination α and the acceleration a are measured continuously within the first time interval $T_1$, and the speed v is measured after the first time interval $T_1$. The first time interval $T_1$ can be adjusted, depending on which person uses the two-wheeled vehicle 130. Thus, the first time interval $T_1$ should usually be longer for older persons than for younger persons. The reason for this is that, in the normal case, the younger person exhibits a more dynamic behavior and, for example, mounts the two-wheeled vehicle more quickly or else starts or brakes the same in a shorter time. For example, a first time interval $T_1$ between 3-10 s would be typical in the case of an older person. In the case of a younger person, on the other hand, for example a first time interval $T_1$ between 1-3 s would be typical. Following the measurement 15 of the lateral inclination α, the acceleration a and the speed v, a first acceleration comparison 20 is carried out. In this first acceleration comparison 20, it is checked whether the measured acceleration a is greater than a minimum positive acceleration $a_{min,pos}$, at least for a second time interval $T_2$:

$$a > a_{min,pos} \quad (1)$$

Here, the second time interval $T_2$ can elapse continuously, which means that multiple measured values which exceed the minimum positive acceleration $a_{min,pos}$ follow one another directly but also, in sum, are assembled from multiple smaller time intervals. The second time interval $T_2$ is adjustable and can, for example, be half as long as the first time interval $T_1$. In this way, it is possible to detect reliably whether an acceleration process was of sufficient duration to conclude therefrom that the two-wheeled vehicle 130 is traveling. The minimum positive acceleration and $a_{min,pos}$ depends on the typical traveling behavior of the person using the two-wheeled vehicle. A usual value for the minimum positive acceleration $a_{min,pos}$ is around 1 m/s² for a leisure cyclist but can also be lower in the case of older persons or higher in the case of athletes.

If, during the first acceleration comparison 20, it transpires that condition (1) has been satisfied, then a first speed comparison 30 is carried out. In the first speed comparison 30, a check is made as to whether the speed v is higher than a minimum speed $v_{min}$:

$$v(T_1) > v_{min} \quad (2)$$

The value of the minimum speed $v_{min}$ is zero or positive in every case but depends on which person uses the two-wheeled vehicle. Thus, this value can be directed toward the walking speed of the user, for example, since above this minimum speed $v_{min}$ it is usually possible to conclude that the two-wheeled vehicle is traveling. Preferably, the value of the minimum speed $v_{min}$ is therefore around 5 km/h for a younger person. For an older person, the value of the minimum speed $v_{min}$ is usually lower, since this person normally has a lower walking speed. It is also conceivable to set the value of the minimum speed $v_{min}$ to zero, by which means it is possible to detect whether the two-wheeled vehicle is at a standstill or is moving. If condition (2) is satisfied, then in method step 70 the saddle 120 of the two-wheeled vehicle 130 is displaced into the travel position 122.

On the other hand, if the result of the first acceleration comparison 20 is that condition (1) is not satisfied, then a second acceleration comparison 40 is carried out. In the second acceleration comparison 40, a check is made as to whether the acceleration a is less than a minimum negative acceleration $a_{min,neg}$, at least over the period of a third time interval $T_3$:

$$a < a_{min,neg} \quad (3)$$

The third time interval $T_3$, just like the second time interval $T_2$, can elapse without interruption but also consist of multiple individual smaller time intervals. The minimum negative acceleration $a_{min,neg}$, just like the minimum positive acceleration $a_{min,pos}$, depends on the person using the two-wheeled vehicle but additionally also on the braking properties of the two-wheeled vehicle itself. Usually, a higher acceleration acts during the braking process than when starting up, which means that a typical value for the minimum negative acceleration $a_{min,neg}$ is, for example, around −2 m/s².

If, during the second acceleration comparison 40, it transpires that condition (3) is satisfied, a second speed comparison 60 is then carried out. In the second speed comparison 60 a check is made as to whether the speed v is higher than the minimum speed $v_{min}$:

$$v(T_1) > v_{min} \quad (4)$$

If condition (4) is not satisfied, then the saddle 120 of the two-wheeled vehicle 130 is displaced into the mounting position 124.

On the other hand, if in the second acceleration comparison 40 it transpires that condition (3) is not satisfied, then a first lateral inclination comparison 50 is carried out. In the first lateral inclination comparison 50, a check is firstly made as to whether a first lateral inclination value $α_1$ is greater than a first lateral inclination limiting value $G_{α,1}$:

$$α_1 > G_{α,1} \quad (5)$$

Secondly, a check is made as to whether a second lateral inclination value $α_2$ is less than a second lateral inclination limiting value $G_{α,2}$ and additionally was measured after the first lateral inclination value $α_1$:

$$α_2 < G_{α,2} \quad (6), \text{ and}$$

$$t_{α2 < G_{α,2}} > t_{α1 > G_{α,1}} \quad (7)$$

If both condition (5) and conditions (6) and (7) are satisfied, then the saddle 120 of the two-wheeled vehicle 130 is displaced into the travel position 122 in method step 70. The values for the first lateral inclination limiting value $G_{α,1}$ and for the second lateral inclination limiting value $G_{α,2}$ are adjustable but with the condition that the first lateral inclination limiting value $G_{\alpha,1}$ is greater than or equal to the second lateral inclination limiting value $G_{\alpha,2}$. Thus, the first lateral inclination limiting value $G_{\alpha,1}$ can, for example, assume values between 10° and 20° in relation to the normal to the roadway, and the second lateral inclination limiting value $G_{\alpha,2}$ can assume values between 1° and 10° in relation to the normal to the roadway. The reason for this lies in the different mounting behavior of different users. Thus, there are persons, in particular older persons, who incline the bicycle very far to the side in order not to have to lift their leg excessively high during mounting. In such a case, the values of the lateral inclination limiting value $G_{\alpha,1}$ and for the second lateral inclination limiting value $G_{\alpha,2}$ can be chosen to be higher than in the case of a person who inclines the bicycle only slightly when mounting.

In the method disclosed in FIG. 1, still further, optional method steps are additionally shown. Thus, if the result of the first speed comparison 30 is that condition (2) is satisfied, an optional second lateral inclination comparison 32 can be carried out, which is carried out before method step 70. By means of the second lateral inclination comparison 32, a check is made as to whether the lateral inclination α after the first time interval $T_1$ is greater than the second lateral inclination limiting value $G_{\alpha,2}$:

$$\alpha(T_1) < G_{\alpha,2} \qquad (8)$$

If this condition (8) is satisfied, the saddle 120 is displaced into the travel position 122 in method step 70.

Furthermore, there is the possibility of carrying out further, optional method steps 52, 54 and/or 56 between the first lateral inclination comparison 50 and method step 70 which is possibly to be carried out, which can be carried out individually or else in combination. In addition, the order of these optional method steps 52, 54 and 56 after the first lateral inclination comparison 50 is interchangeable.

Thus, in an optional third acceleration comparison 52, a check is made as to whether at least one acceleration value $a_1$ is greater than the minimum positive acceleration $a_{min,pos}$ and this exceeding of the minimum positive acceleration $a_{min,pos}$ has been measured chronologically after the second lateral inclination value $\alpha_2$:

$$a_1 > a_{min,pos} \qquad (9), \text{ and}$$

$$t_{a_1 > a_{min,pos}} > t_{\alpha_2 > G,\alpha_2} \qquad (10)$$

If both conditions (9) and (10) are satisfied, the saddle 120 is displaced into the travel position 122.

In an optional third speed comparison 54, a check is further made as to whether the speed v after the first time interval $T_1$ is higher than the minimum speed $v_{min}$:

$$v(T_1) > v_{min} \qquad (11)$$

If this is so, the saddle 120 is displaced into the travel position 122.

In addition, in an optional third lateral inclination comparison 56 still before the method step 70, a check is made as to whether the lateral inclination α after the time interval $T_1$ is lower than the second lateral inclination limiting value $G_{\alpha,2}$:

$$\alpha(T_1) < G_{\alpha,2} \qquad (12)$$

If this is so, method step 70 is carried out and thus the saddle 120 is displaced into the travel position 122.

In all the aforementioned cases, it is possible that the saddle 120 is displaced into the travel position 122 or into the mounting position 124 with a time delay. A typical delay is between 1-5 s.

In all cases which do not lead explicitly to a further method step, the method is terminated without carrying out a further method step.

After the method has been terminated, the method can be started again. Alternatively, it is also conceivable to arrange for the method to proceed regularly. It is also possible that the method is started again before the previously started method has been completed. In this way, for example, the respective first time intervals $T_1$ of the methods proceeding one after another can intersect.

Figure 2:
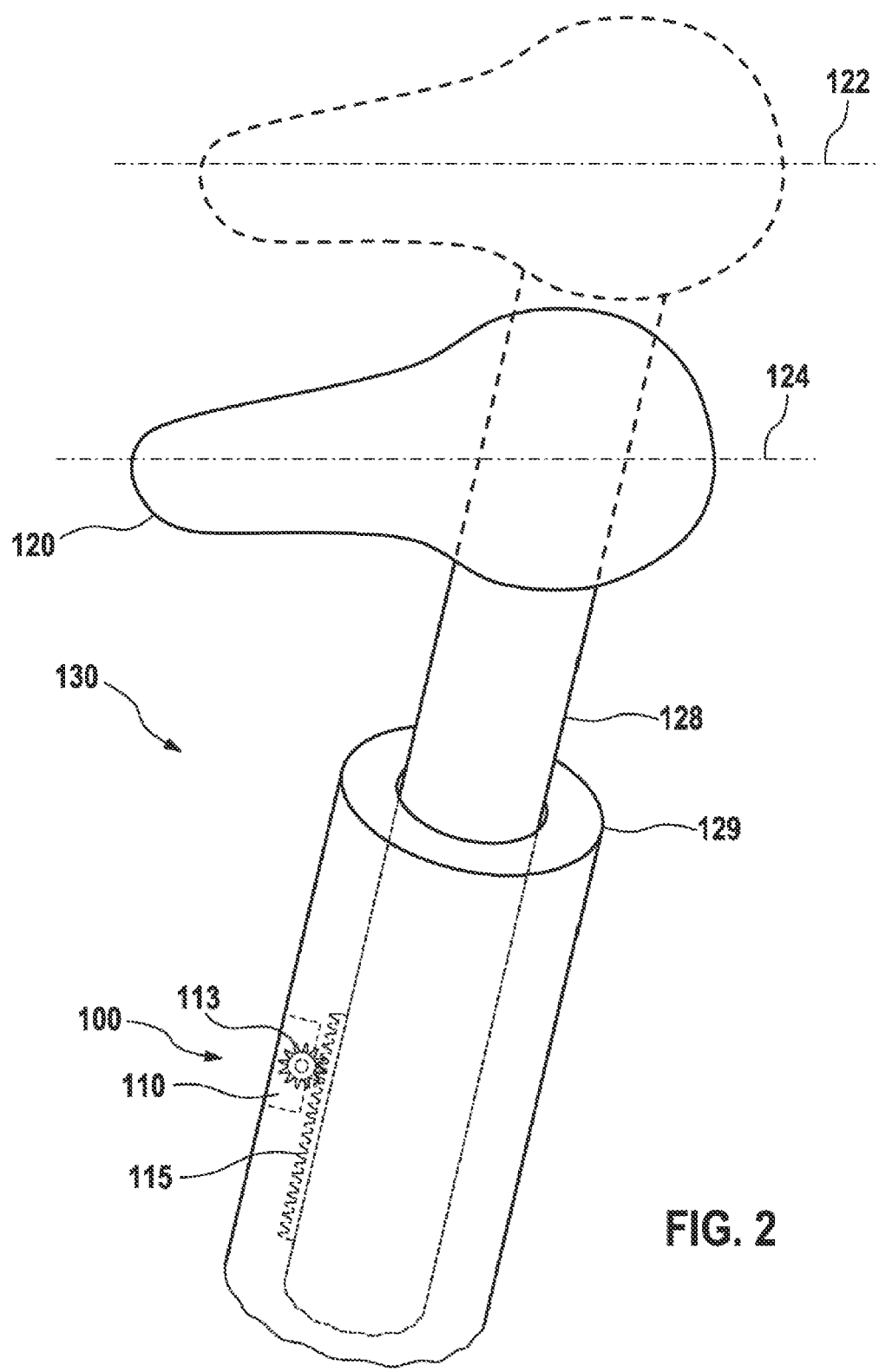
FIG. 2 shows a first exemplary embodiment of a device according to the disclosure.

FIG. 2 shows a first exemplary embodiment of a device according to the disclosure. The illustration shows a device 100 having a drive 110. This drive 110 is used to displace the height of a saddle 120 of a two-wheeled vehicle 130. Here, the drive is activated as shown in FIG. 1. The saddle 120 can be displaced into a travel position 122 or a mounting position 124, depending on the situation, wherein the mounting position 124 is arranged to be lower with respect to the travel position 122. The drive 110 is arranged within a saddle tube 129. Also provided is a pinion 123, which is fixed to the drive 110. The pinion bears on a rack 115, which is fixed vertically from outside on a saddle pillar 128 of the saddle 120. Thus, by means of the drive 110, the pinion 123 can be set rotating, which in turn means that the rack 1 fixed to the saddle pillar 128 can be moved upward or downward and, ultimately, the height of the saddle 120 can be adapted.

In an alternative exemplary embodiment, not illustrated, the rack 115 is fixed to the inside of the saddle pillar 128. For this purpose, the saddle tube must be configured to be partly hollow. In a further, alternative exemplary embodiment, not illustrated, the pinion 113 is replaced by a threaded rod 111.

The invention claimed is:

1. A method for controlling a drive for displacing a saddle of a two-wheeled vehicle into a travel position or into a mounting position, comprising:
    measuring an acceleration and a lateral inclination of the two-wheeled vehicle continuously within a first time interval;
    measuring a speed of the two-wheeled vehicle after the first time interval;
    carrying out a first acceleration comparison, which checks whether the measured acceleration is greater than a minimum positive acceleration, at least for a second time interval;
    carrying out a first speed comparison if the first acceleration comparison is positive, the first speed comparison checks whether the measured speed is higher than a minimum speed;
    displacing the saddle into the travel position if the first speed comparison is positive;
    carrying out a second acceleration comparison if the first acceleration comparison is negative, the second acceleration comparison checks whether the measured acceleration is less than a minimum negative acceleration at least for a third time interval
    carrying out a second speed comparison if the second acceleration comparison is positive, the second speed comparison checks whether the measured speed is higher than the minimum speed; and
    displacing the saddle into the mounting position if the second speed comparison is negative.

2. The method as claimed in claim 1, further comprising:
    carrying out a first lateral inclination comparison if the second acceleration comparison is negative, the first lateral inclination comparison checks whether a first lateral inclination value is greater than a first lateral inclination limiting value, and whether a second lateral inclination value, which has been measured after the first lateral inclination value, is less than a second lateral inclination limiting value, wherein the first lateral inclination limiting value is greater than or equal to the second lateral inclination limiting value; and displacing the saddle into the travel position if the first lateral inclination comparison is positive.

3. The method as claimed in claim 2, further comprising:
carrying out a third acceleration comparison if the first lateral inclination comparison is positive, the third acceleration comparison checks whether at least one acceleration value, which was measured chronologically after the second lateral inclination value, is greater than the minimum positive acceleration; and displacing the saddle into the travel position if the third acceleration comparison is positive.

4. The method as claimed in claim 2, further comprising:
carrying out a third speed comparison if the first lateral inclination comparison is positive, the third speed comparison checks whether the measured speed is higher than the minimum speed; and displacing the saddle into the travel position if the third speed comparison is positive.

5. The method as claimed in claim 2, further comprising:
carrying out a third lateral inclination comparison if the first lateral inclination comparison is positive, the third lateral inclination comparison checks whether the lateral inclination after the first time interval is less than the second lateral inclination limiting value; and displacing the saddle into the travel position if the third lateral inclination comparison is positive.

6. The method as claimed in claim 1, further comprising:
displacing the saddle with a time delay.

7. The method as claimed in claim 1, further comprising:
carrying out a second lateral inclination comparison if the first speed comparison is positive, the second lateral inclination comparison checks whether the lateral inclination after the first time interval is smaller than a second lateral inclination limiting value; and displacing the saddle into the travel position if the second lateral inclination comparison is positive.

* * * * *